(12) United States Patent
Walsh et al.

(10) Patent No.: US 9,148,510 B2
(45) Date of Patent: Sep. 29, 2015

(54) SMART PHONE CROWD ENHANCEMENT

(75) Inventors: Eamonn Walsh, Hamilton (NZ); Ian Anthony, Hamilton (NZ); Bruce Seymour, New Haven, CT (US)

(73) Assignee: MEA Mobile, New Haven, CT (US)

( * ) Notice: Subject to any disclaimer, the term of this patent is extended or adjusted under 35 U.S.C. 154(b) by 86 days.

(21) Appl. No.: 13/382,894

(22) PCT Filed: Jun. 23, 2010

(86) PCT No.: PCT/NZ2010/000121
§ 371 (c)(1),
(2), (4) Date: Apr. 2, 2012

(87) PCT Pub. No.: WO2011/040821
PCT Pub. Date: Apr. 7, 2011

(65) Prior Publication Data
US 2012/0184304 A1    Jul. 19, 2012

(30) Foreign Application Priority Data

Jun. 23, 2009 (NZ) .......................... 577887
Oct. 30, 2009 (NZ) ........................ 580789

(51) Int. Cl.
H04W 4/02      (2009.01)
H04M 3/487     (2006.01)
H04L 29/08     (2006.01)
H04M 3/42      (2006.01)

(52) U.S. Cl.
CPC ............ *H04M 3/4872* (2013.01); *H04L 67/04* (2013.01); *H04L 67/18* (2013.01); *H04L 67/303* (2013.01); *H04L 67/36* (2013.01); *H04M 3/42348* (2013.01); *H04M 2242/15* (2013.01)

(58) Field of Classification Search
CPC .... H04W 4/02; H04W 64/00; H04M 1/72572
USPC ................ 455/456.3, 566, 414.1, 456.1–457
See application file for complete search history.

(56) References Cited

U.S. PATENT DOCUMENTS

| | | | |
|---|---|---|---|
| 6,965,785 B2 | 11/2005 | Mager et al. | |
| 2003/0017823 A1* | 1/2003 | Mager et al. | .................. 455/414 |
| 2005/0221841 A1 | 10/2005 | Piccionelli et al. | |
| 2007/0204218 A1* | 8/2007 | Weber et al. | .................. 715/530 |
| 2007/0239843 A1* | 10/2007 | Knowles et al. | ............. 709/217 |
| 2007/0287489 A1 | 12/2007 | Inselberg | |
| 2008/0045236 A1* | 2/2008 | Nahon et al. | ............... 455/456.1 |
| 2008/0275349 A1* | 11/2008 | Halperin et al. | ............. 600/484 |
| 2009/0149159 A1* | 6/2009 | Han | .......................... 455/414.1 |
| 2010/0008583 A1* | 1/2010 | Winstead | ....................... 382/185 |

* cited by examiner

Primary Examiner — Kashif Siddiqui
Assistant Examiner — Farideh Madani

(57) ABSTRACT

A system for displaying information on multiple mobile devices whereby the information displayed for each device is determined by the device's physical location in relation to other devices physical locations. The information may be graphic, text, numerical or audible.

20 Claims, 6 Drawing Sheets

SMART PHONE CROWD ENHANCEMENT

FIELD OF INVENTION

The present invention relates generally to mobile device display screens and more specifically to the relationships between information displayed on multiple mobile devices display screens which may be in motion, when utilized in conjunction with one another over a geographic area at a given time.

BACKGROUND OF THE INVENTION

Typically when a gathered crowd of people sends a message, they do so by shouting in unison or with movement such as a hand wave. These movements may also involve objects. For example, at a baseball game, fans may stomp their shoes or wave their baseball caps. Furthermore, a crowd may work together to create a synchronized motion.

A common example of a synchronized crowd motion is a stadium wave which is achieved in a packed area when successive groups of spectators briefly stand and raise their arms. Each spectator rises at the same time as those straight in front and behind, and slightly after the person immediately to either the right (for a clockwise wave) or the left (for a counterclockwise wave). Immediately upon stretching to full height, the spectator returns to the usual seated position.

Another common example of a synchronized crowd motion is when concert spectators raise their lighters in hand and sway in unison to the tempo of live music.

These methods however are limited in that the objects used in conjunction with physical movements can not be dynamically updated to transmit different information without being manipulated by the user. That is, a crowd might decide to sway at a different tempo, but it's the user that has to change their own movement speeds. Another example would be: A group of users raise their mobile phones in the air at a music concert. They all have a blank white screen showing on the phone. If they are prompted to change the screen to green, each user would have to execute the request manually.

The present device seeks to augment crowd capability by utilizing mobile devices in conjunction with one another to present synchronized group messages that can be dynamically updated and retain their cohesiveness while the crowd is moving.

For example, a crowd carrying mobile devices such as Apple's iPhone can all raise their phones with an orientation allowing onlookers to see the displays. Subsequently, the individual iPhone screens can be used in conjunction to form in aggregate, a larger image to onlookers. As the members of the crowd move, the individual images on the iPhone screens are updated using an algorithm so that the aggregate image remains intact.

It is also known that mobile devices have accelerometers, magnetometers, cameras, Bluetooth communications, wireless data systems and other mechanisms for input. The invention will incorporate one or more of these inputs to relate information about the user's state in order to communicate the information effectively throughout the group of mobile devices. It can also use these inputs to modify the information displayed on the mobile devices.

The present device will work in large and small groups. Furthermore, it may incorporate various communications protocols such as those of Mobile ad hoc (MANET) and Mesh networking. As described by Wikipedia, Mesh networking is a way to route data, voice and instructions between nodes. It allows for continuous connections and reconfiguration around broken or blocked paths by "hopping" from node to node until the destination is reached. A mesh network whose nodes are all connected to each other is a fully connected network. MANET can also deal with the problems introduced by the mobility of the nodes. Mesh networks are self-healing: the network can still operate when one node breaks down or a connection goes bad.

DISCUSSION OF RELATED ART

In U.S. Pat. No. 5,361,078 "Multiple screen graphics display" Caine, Lester S. shows a display system comprised of a wall of video screens each driven by a video driver. Information to be displayed is supplied from a host computer. Each screen displays a portion of an image or the whole image.

This invention is limited by the necessity of a dedicated host computer. It is also limited because the displays are in a static configuration and are not wireless or mobile.

In U.S. Pat. No. 5,606,336, "Display control apparatus" Yuki, Osamu, specifies a system whereby a group of display screens are synchronized with a single computer. As LCD horizontal scan times vary with temperature this device uses LCD temperature as a feedback mechanism to synchronize the displays correctly. This device uses screens in fixed positions. The current invention's screen updating is not dependent on temperature of the individual LCD screens.

In U.S. Pat. No. 7,091,926 "Computer display system using multiple screens" Charles Kulas describes a complex arrangement of arbitrarily placed screens. While the positioning of the screens in his invention is arbitrary, the individual screens are physically mounted so that viewers can see the information presented on the screens. The information for each screen is determined by its position and the screens are not intended to be moved while the invention is being used.

ADVANTAGES

The present invention may have one or more of the following advantages:

The information displayed on the individual devices is determined by its position relative to the other displays in the display group. Thus when one device is removed or rearranged, the system compensates to maintain the integrity of the overall image, message or information being displayed.

Each individual display is a component of an individual mobile device; any of which can be utilized as a host device. Other systems utilizing multiple display devices rely on a dedicated host.

In the current invention the devices are not hard wired together.

The system is designed so that one or more the screens in the group can be in motion during its use. Other systems for dynamically updating multiple screens rely on the screens being in fixed positions for the duration of their use.

The invention is designed to dynamically update the information sent to the individual mobile devices based on the position of the target phone.

The invention is designed to anticipate crowd movements and dynamically update the information sent to the individual screens based on the projected physical attributes of the devices over time.

It is not necessary for the user to view the information on the screen in order to interact with the invention.

SUMMARY OF THE INVENTION

The present invention consists of a group of mobile devices with display screens. First it is determined how many devices will consist of a Group. The Group may be comprised of one or more mobile devices of various manufacture.

One or more mobile devices are selected out of the Group to be the Root device. The position and orientation of the other mobile device display screens is then determined in relation to the location of the Root device or devices.

A message is created by a Control User which may or may not be the Root device. Using an algorithm, the Control User device determines the optimal way to display the message on the Group devices based on the physical attributes of the individual mobile devices including but not limited to their number, screen size, orientation and position in three dimensional space.

The message is then divided, replicated, or manipulated to be presented on the Group's mobile devices.

As the physical attributes including position of the individual mobile devices changes, the invention compensates for the physical attribute changes to retain the integrity of the message to the extent possible under a given situation.

The Control device is capable of dynamically updating the information sent to one or more of the Group devices.

It is also contemplated that the Control device is capable of anticipating the movements of the individual Group devices. Furthermore, the Control device is capable of sending information to the Group devices based on the anticipated physical attributes of the Group devices.

It is further contemplated that the Control device is capable of anticipating aggregate crowd movements and determining what information is sent to the Group devices before the movements occur.

It is contemplated that the algorithm used to determine the position of the Group devices is based on the relative strength of a wireless communications signal such as Bluetooth.

DRAWINGS-FIGURES

Figure 6:
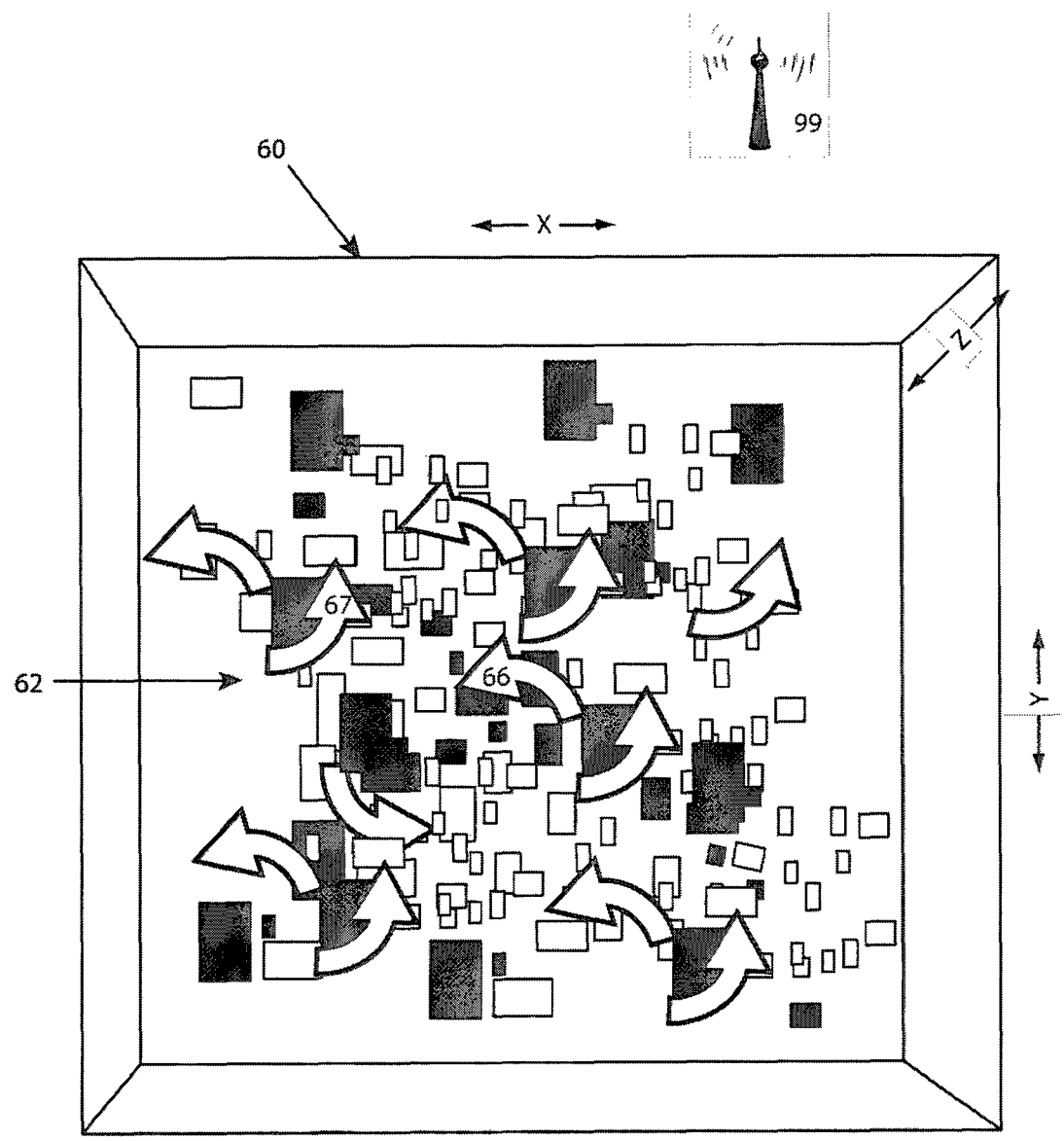

FIG. 6. Is a diagram illustrating a group of mobile devices in a defined area where the mobile devices are moving and the information being displayed is changing.

DESCRIPTION OF THE PREFERRED EMBODIMENT

The following is presently contemplated for this embodiment, but other values, dimensions, can be used.

Figure 1:
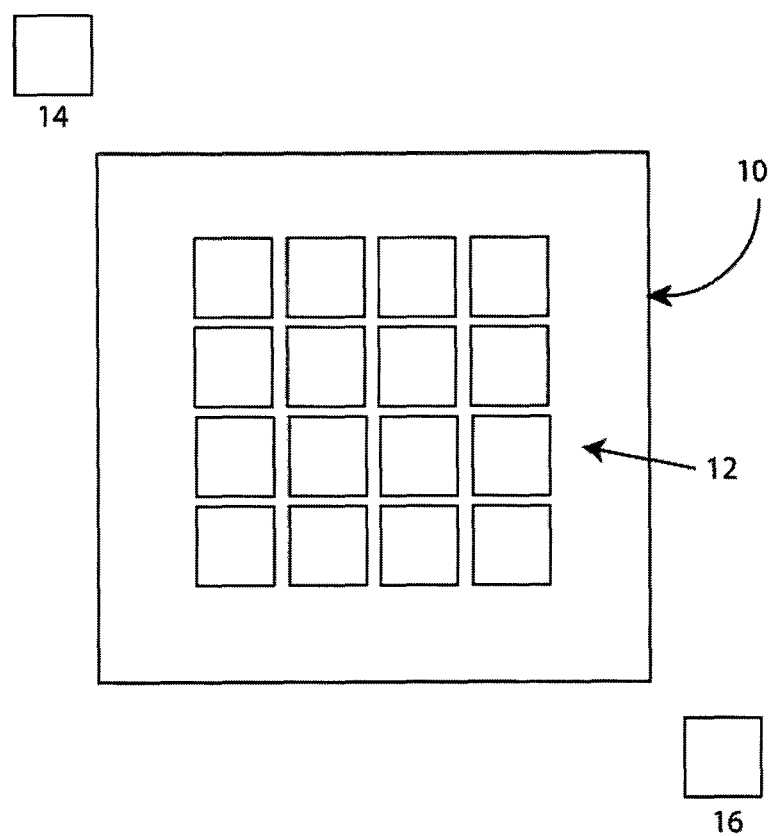
FIG. 1 is a diagram illustrating a group of mobile devices in a defined area.

Turning now to FIG. 1 An area 10 is defined whereby mobile devices 12 within the physical boundaries 10 become part of the group. The physical boundaries for the group can be modified along any dimension in real time. For example, the groups boundaries may set to the three dimensional area within a football stadium. Furthermore any devices 14 outside the area 10 entering the area 10 become part of the group 12 and any mobile devices 16 leaving the area 10 exit the group.

Figure 2:
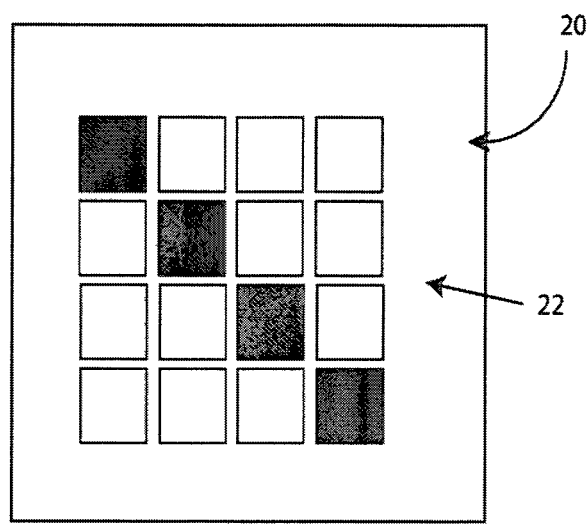
FIG. 2 is a diagram illustrating a group of mobile devices in a defined area displaying information.

Turning to FIG. 2 The group of mobile devices 22 are in a given area 20 and are cued to display certain information which creates a visual pattern.

Figure 3:
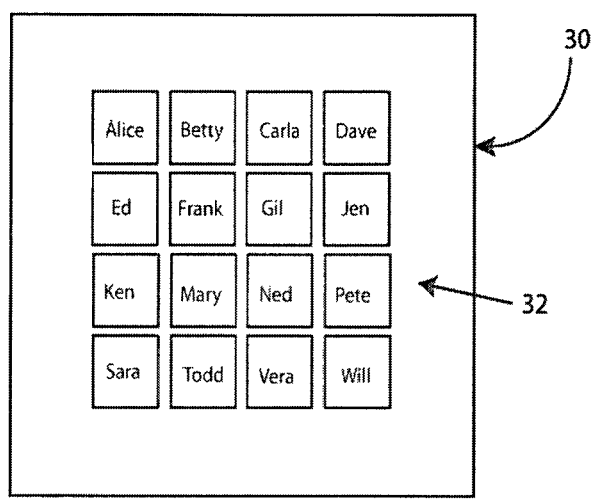
FIG. 3 is a diagram illustrating a group of named mobile devices in a defined area.

Turning to FIG. 3. The group of mobile devices 32 are in a given area 30 and their physical positions in relation to one another are determined and recorded. This can be accomplished using a number of methods including the relative strength of a communication signal, such as Bluetooth or wireless TCP/IP. It is also contemplated that the users position can be determined using a GPS signal. It is also contemplated that this can be accomplished using another wireless signal.

Each mobile device is assigned a name.

Figure 4:
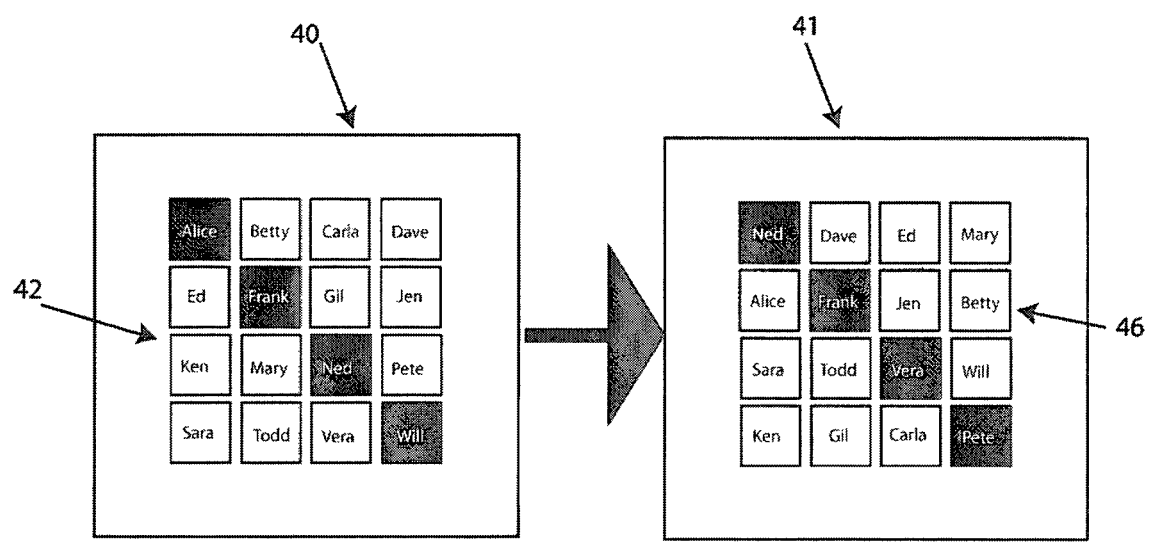
FIG. 4 is a diagram illustrating a group of named mobile devices in a defined area displaying information.

Turning to FIG. 4. The group of mobile devices 42 are in a given area 40 and their physical positions in relation to one another have been determined by an algorithm and recorded; each mobile device is assigned a name or identification. Certain devices within the group 42 are cued to display certain information which creates a visual pattern. As positions of the individual mobile devices within the group of devices change 46, the information presented on each mobile device changes based on the new positions of the mobile devices. Thus the overall visual pattern on the mobile device group 40 and 41 remains the same over time as the positions of the mobile devices shift.

Figure 5:
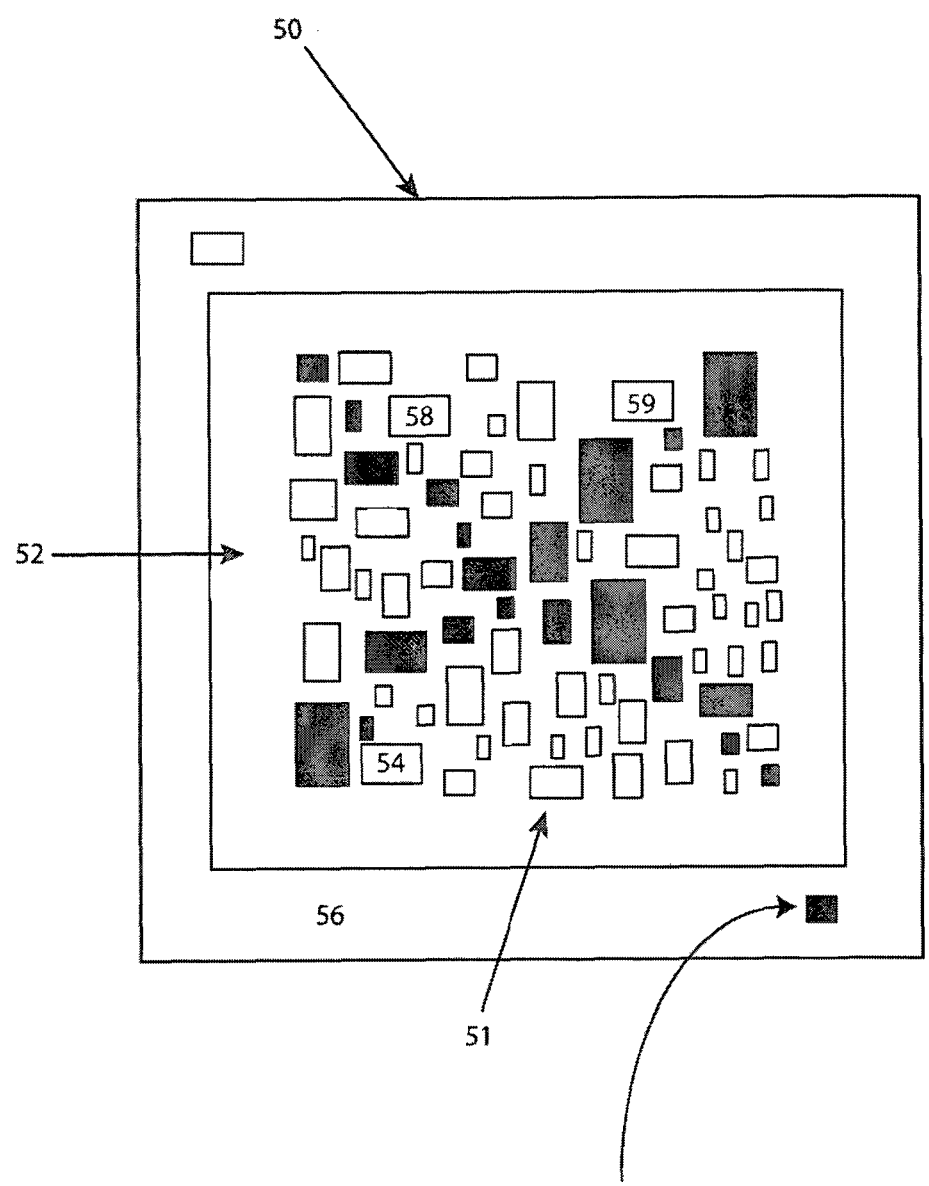
FIG. 5 is a diagram illustrating a group of named mobile devices in a defined area displaying information where the positions of the mobile devices change.

Turning to FIG. 5 a group of people are holding mobile devices 52 of different makes and models that may have different physical attributes such as screen size and display technology and are connected to various communication networks. The physical locations of the mobile devices 52 are determined in relation to one another within the area 50.

Once the locations of all the mobile devices 52 in the system are determined, one device is determined to be the Root device 54. Any device within the area 50 may be the Root device. The Root device determines the information being sent to other devices in the group 52 based on the mobile devices physical position, orientation and other physical attributes. For example, a user 51 in the area 50 with a Root device 54 may determine a picture of an "X" should be displayed as a mosaic across the group of mobile devices. Once the information is selected, that is the image of the "X", the Root device breaks down the information, in this case the picture, into pieces that will effectively display the image of the "X" across a number of mobile device screens within a Group 50. As the members of the Group move, the Root device updates the information being sent to the individual devices to retain the integrity of the image when viewed in aggregate. If the Root device 54 enters the group buffer zone 56 the Root device uses an algorithm to determine which other mobile device within the group will become the new Root device 58 and a communication of the change is sent to the new Root device 58 which may relay it to the other devices in the group.

It is further contemplated that the device can be used in a crowd setting to distract players, display advertisements, and enable a new level of crowd interaction. It is contemplated that an algorithm will be used to sync adjacent mobile device screens based on location to one large image based on certain criteria. Technologies contemplated are Bluetooth, WiFi, SMS, IP, infrared, image capture and zero connectivity versions.

It is further contemplated that the technology used to enable the invention will be developed for cross-platform deployment. That is, the device will work with multiple mobile device platforms and on different mobile device networks and use multiple communication protocols if necessary. For example users of various Smart Phones models (such as the iPhone, G1, Palm) will all be able to utilize the invention and it will work on different telecommunication networks such as 3G, AT&T, Verizon, Virgin.

The invention will be able to display branding visible to both the user on a personal scale and a wider audience on a macro scale. For example a user may see the outline of a dolphin on their individual phone, and when combined with other images presented on adjacent phones, see a larger dolphin.

It is further contemplated that the invention will incorporate audio synchronization between multiple mobile devices. For example by harnessing small audio outputs from multiple devices, users can create a louder sound.

It is further contemplated that a user voting system will be integrated into the invention whereby users 59 of individual mobile devices such as smart phones in the Group 52 can vote for the image they want displayed in the area 50.

It is further contemplated that the invention will enable a system whereby users 52 can submit their own graphics to be displayed by the Group 50.

It is further contemplated that the visual macro image can be manipulated by real time audio. For example an image can change when the audio sound of clapping or cheering is recognized.

Turning now to FIG. 6 The group 62 of mobile devices may vary in size from a small group to a large group and that they may be self organized. The area 60 of the group 62 may be defined in a three dimensional space. Information may be cued on the devices which forms three dimensional images. It is contemplated that the mobile devices 62 are in constant motion 66 and motion images are created by utilizing persistence of vision.

It may the be case that the group 62 is disconnected from a larger communications network 99 such as AT&T's 3G network of cell phone towers. Thus the invention can operate using Mobile ad hoc network MANET which enables the invention to operate without the need for connectivity to a network outside the area 60. The movements 67 of the mobile devices 62 may be random or synchronized.

It is contemplated that a user may raise their mobile device rapidly and the invention may detect this movement using one of the sensors on the mobile device such as with one or more accelerometers. Thus the invention may assume the user is participating in a "Mexican Wave" and the screen will light up and the device might emit a sound. The invention may also modify what information is displayed on the mobile device if the user moves the device in a specific patter. For example if a user shakes their mobile device aggressively the invention may determine the user would like to create a distraction and this the screen will flash rapidly between images and may emit a negative sound. It is also contemplated that the invention may cue the group by various methods such as a timer or audio cue to create a pattern such as a distraction.

It is further contemplated that users might wave their mobile device gently above their heads and the invention will assume a "Sway" mode, where the screen will modulate between soft colors in time with your wave. The user will be able to set palettes according to personal preferences or in order to reflect support for a team or organization.

It is also contemplated that the invention can provide feedback for to the individual users. For example the device may calculate how synchronized the group is as a whole and how in synchronization an individual is in relation to the group. This information can be provided to the user in a number of forms including pictures.

CONCLUSION, RAMIFICATIONS, AND SCOPE

The reader will see that, according to one embodiment of the invention the device has created a large image by utilizing a group of mobile device screens while the mobile device screens are in motion. While the above description contains many specificities, these should not be construed as limitations on the scope of any embodiment, but as exemplifications of the presently preferred embodiments thereof. Many other ramifications and variations are possible within the teachings of the various embodiments. Thus the scope of the invention should be determined by the appended claims and their legal equivalents, and not by the examples given.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included within the scope of the present invention.

What is claimed is:

1. A computer implemented method of facilitating coordinated displays of crowd visual patterns using mobile computing devices, said method comprising:
    defining a crowd boundary of a gathered crowd;
    dynamically identifying a plurality of mobile computing devices located within said crowd boundary;
    at a control device identified from one of said plurality of mobile computing devices, identifying a crowd visual pattern; and
    at said control device and based on respective physical attributes of said plurality of mobile computing devices, dynamically converting said crowd visual pattern into respective display information to be displayed on display devices associated with said plurality of mobile computing devices, wherein coordinate display of said respective display information on said display devices render said crowd visual pattern among said gathered crowd;
    selecting one or more select devices from said plurality of mobile computing devices;
    determining positions and orientations of said plurality of mobile computing devices relative to positions and orientations of said one or more select devices, and wherein further said control device is a select device;
    identifying a buffer zone proximate to and outside said crowd boundary; and
    upon a detection that said control device has moved in said buffer zone, at said control device, automatically identifying a new control device.

2. The computer implemented method of claim 1 further comprising:
    sending a message from said control device to a respective device of said plurality of mobile computing devices, wherein said message comprises converted display information for said respective device; and
    rendering said converted display information for display on a display device associated with said respective device.

3. The computer implemented method of claim 2, wherein said rendering comprises synchronizing said display on said display device with an adjacent mobile computing device, and further comprising presenting synchronization performance with respect to said rendering to a user of said respective device on said display device.

4. The computer implemented method of claim 2, wherein said dynamically converting comprises updating said converted display information based on a position change of said respective device to maintain said crowd visual pattern among said gathered crowd.

5. The computer implemented method of claim 1, wherein said identifying said crowd visual pattern comprises identifying said crowd visual pattern responsive to a user input to said control device.

6. The computer implemented method of claim 2, wherein said identifying said crowd visual pattern comprises:
at said respective device, receiving user input for voting on candidate crowd visual patterns; and
at said control device, automatically identifying said crowd visual pattern based on a voting result collected from said plurality of mobile computing devices.

7. The computer implemented method of claim 5 further comprising, at said control device, receiving a candidate crowd visual pattern submitted from said respective device.

8. The computer implemented method of claim 1 further comprising assigning an identifier to each of said plurality of mobile computing devices, wherein said physical attributes comprise display identifiers, display device sizes, orientations, and positions in three-dimensional space.

9. The computer implemented method of claim 2 further comprising, upon a detection of a predetermined motion pattern of said respective device, rendering predetermined display information on said display device and rendering a predetermined audio from said respective device.

10. The computer implemented method of claim 2 further comprising, upon a detection of a predetermined ambient audio cue, rendering predetermined display information on said display device and emitting a predetermined sound from said respective device.

11. The computer implemented method of claim 2 further comprising receiving user input to said respective device for selecting a palette theme for said crowd visual pattern.

12. The computer implemented method of claim 2, wherein said control device and said respective device are configured to operate in different operating systems and communicate using a mobile ad hoc network.

13. The computer implemented method of claim 2, wherein said crowd visual pattern is a three-dimensional image pattern.

14. The computer implemented method of claim 1 further comprising, at said control device, predicting aggregate crowd movements and determining another respective display information of said plurality of mobile computing devices based on said predicting.

15. The computer implemented method of claim 1 further comprising, at said control device, predicting said physical attributes of said plurality of mobile computing devices and determining another respective display information of said plurality of mobile computing devices based on said predicting.

16. A computer implemented method of facilitating coordinated displays of crowd visual patterns using mobile computing devices, said method comprising:
defining a crowd boundary of a gathered crowd;
dynamically identifying a plurality of mobile computing devices located within said crowd boundary;
at a control device identified from one of said plurality of mobile computing devices, identifying a crowd visual pattern;
at said control device and based on respective physical attributes of said plurality of mobile computing devices, dynamically converting said crowd visual pattern into respective display information to be displayed on display devices associated with said plurality of mobile computing devices, wherein coordinate display of said respective display information on said display devices render said crowd visual pattern among said gathered crowd;
sending a message from said control device to a respective device of said plurality of mobile computing devices, wherein said message comprises converted display information for said respective device;
rendering said converted display information for display on a display device associated with said respective device, wherein said rendering comprises synchronizing said display on said display device with an adjacent mobile computing device; and
presenting synchronization performance with respect to said rendering to a user of said respective device on said display device.

17. The computer implemented method of claim 16 further comprising:
selecting one or more select devices from said plurality of mobile computing devices;
determining positions and orientations of said plurality of mobile computing devices relative to positions and orientations of said one or more select devices, and wherein further said control device is a select device;
identifying a buffer zone proximate to and outside said crowd boundary; and
upon a detection that said control device has moved in said buffer zone, at said control device, automatically identifying a new control device.

18. The computer implemented method of claim 16, wherein said dynamically converting comprises updating said converted display information based on a position change of said respective device to maintain said crowd visual pattern among said gathered crowd.

19. The computer implemented method of claim 16, wherein said identifying said crowd visual pattern comprises:
at said respective device, receiving user input for voting on candidate crowd visual patterns; and
at said control device, automatically identifying said crowd visual pattern based on a voting result collected from said plurality of mobile computing devices.

20. The computer implemented method of claim 16 further comprising: at said control device, predicting aggregate crowd movements and determining another respective display information of said plurality of mobile computing devices based on said predicting.

* * * * *